United States Patent [19]

Ando et al.

[11] Patent Number: 4,785,364
[45] Date of Patent: Nov. 15, 1988

[54] CASSETTE LOADING APPARATUS WITH IMPROVED SIDE PLATES

[75] Inventors: Takashi Ando; Yoshihiro Makino, both of Osaka, Japan

[73] Assignee: Matsushita Electric Industrial Co., Ltd., Osaka, Japan

[21] Appl. No.: 7,217

[22] Filed: Jan. 27, 1987

[30] Foreign Application Priority Data

Jan. 27, 1986 [JP] Japan ................................. 61-15151

[51] Int. Cl.⁴ ............................................. G11B 15/60
[52] U.S. Cl. .................................................. 360/96.5
[58] Field of Search ......................... 360/96.5, 96.6, 71

[56] References Cited

U.S. PATENT DOCUMENTS 4,308,562 12/1981 Negishi ................................... 360/71
4,484,240 11/1984 Yoshida ............................... 360/96.5
4,685,009 8/1987 Min et al. ......................... 360/96.5 X

*Primary Examiner*—John H. Wolff
*Attorney, Agent, or Firm*—Pollock, VandeSande & Priddy

[57] ABSTRACT

In a cassette loading apparatus used for carrying a tape cassette from an unloading position to a loading position, cutouts are made in side plates to be continuous to L-shaped guide slots made therein so that the cassette holder unit having outwardly projecting pins can be inserted from the top when assembling the same with the side plates. After the cassette holder unit is assembled, a top plate having projecting plates may be attached to the side plates so that the cutouts are filled with the projecting plates. The projecting plates have rounded corners for smooth movement of the projecting pins along the L-shaped guide slots.

7 Claims, 4 Drawing Sheets

CASSETTE LOADING APPARATUS WITH IMPROVED SIDE PLATES

BACKGROUND OF THE INVENTION

This invention relates generally to cassette loading apparatus used for a magnetic recording/reproducing apparatus, such as a video tape recorder.

Various types of cassette loading apparatus used for magnetic recording/ reproducing apparatus, such as a video tape recorder are known, and a so called front-loading system is mainly adopted so that a tape cassette is inserted from the front opening. Although such a front-loading cassette loading apparatus satisfactorily operates, it requires a number of assembling processes due to relatively complex structure. For this reason, cassette loading apparatus have hitherto been assembled separately from the body of the magnetic recording/reproducing apparatus.

SUMMARY OF THE INVENTION

The present invention has been developed in order to remove the above-described drawbacks inherent in the conventional cassette loading apparatus.

It is, therefore, an object of the present invention to provide a new and useful cassette loading apparatus which can be assembled easily with fewer number of assembling processes.

A feature of the present invention resides in the fact that cutouts are made in side plates so that a cassette holder unit having at least one projecting pin can be inserted from the top when assembling.

In accordance with the present invention there is provided a cassette loading apparatus, comprising: a cassette holder unit for holding a tape cassette therein and movable between first and second positions, said cassette holder unit having a plurality of projecting pins outwardly projecting from said cassette holder unit; a pair of side plates having L-shaped guide slots for receiving said projecting pins so as to guide the same when said cassette holder unit moves between said first and second positions, cutouts being formed in said side plates to be continuous with said L-shaped guide slots so that said cassette holder unit can be inserted from the top when assembling the same with said side plates; and drive means for moving said cassette holder unit between said first and second positions by applying a driving force thereto.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Prior to describing the preferred embodiment of the present invention, the above-mentioned conventional cassette loading apparatus will be described with reference to FIGS. 1 and 2 for a better understanding of the present invention.

Figure 1:
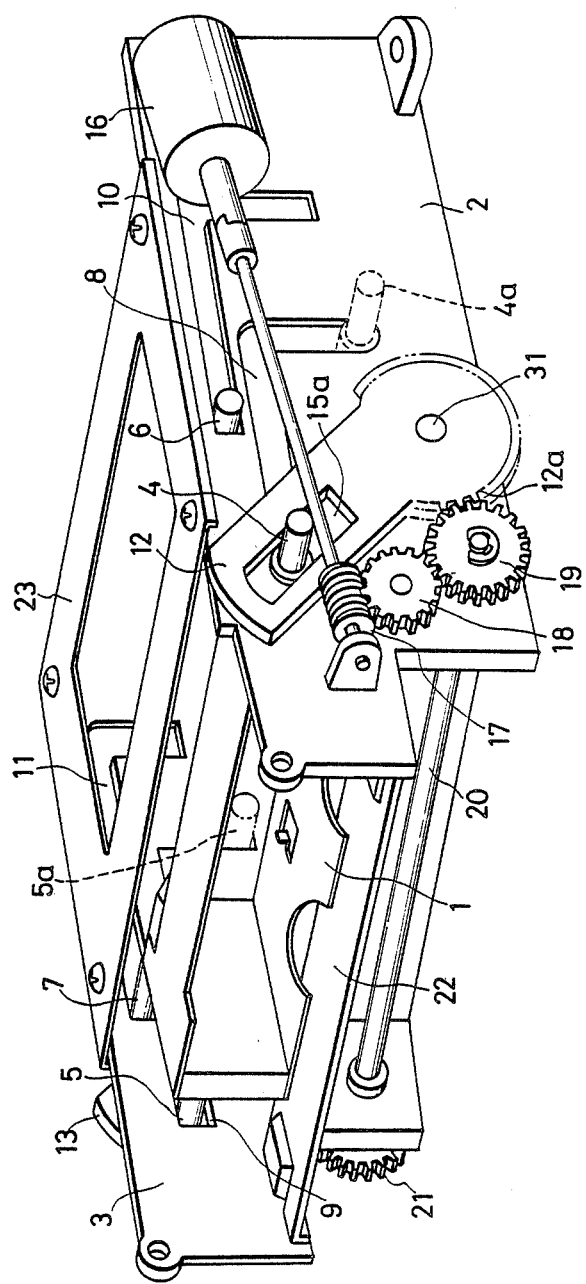
FIG. 1 is a perspective view showing an example of a conventional cassette loading apparatus.
Figure 2:
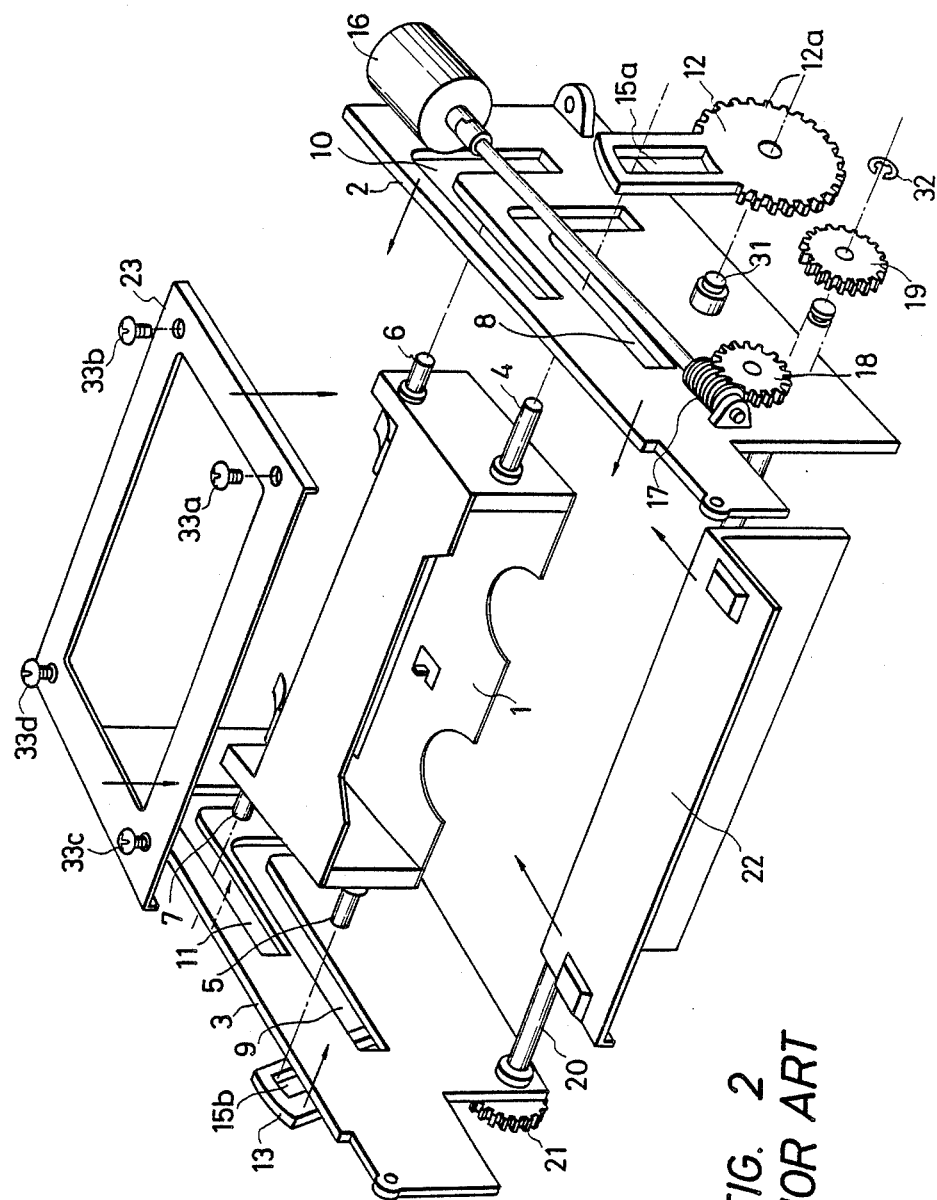
FIG. 2 is an exploded perspective view showing how to assemble the conventional cassette loading apparatus of FIG. 1.

Referring now to FIG. 1, a perspective view of a conventional cassette loading apparatus is shown. The reference 1 indicates a cassette holder unit for detachably holding an unshown tape cassette, such as a video cassette. The references 2 and 3 are side plates or side frames which are arranged at both sides of the cassette holder unit 1. L-shaped guide slots 8 and 10 are formed in the right side plate 2, while L-shaped guide slots 9 and 11 are formed in the left side plate 3. Projecting pins 4, 5 and 6, 7 are provided to both sides of the cassette holder unit 1 to be engaged with the L-shaped guide slots 8, 9 and 10 and 11 respectively. Drive arms 12 and 13 are provided for moving the cassette holder unit 1 from a first position to a second position and vice versa. More specifically, the cassette holder unit 1 is moved horizontally and vertically assuming that the cassette loading apparatus is put horizontally, as the projecting pins 4, 5, 6 and 7 move along the L-shaped guide slots 8, 9, 10 and 11. The references 4a and 5a respectively show the projecting pins 4 and 5 which are at the second or loading position. The drive arms 12 and 13 have toothed portions 12a and 13a respectively and are rotatably held at the outer side of the side plates 2 and 3. The reference 16 is a drive motor which transmits a driving force via a worm 17, a worm wheel 18 and a relay gear 19 to the toothed portion 12a. The relay gear 19 is fixed to one end of a shaft 20 which is rotatably supported by the side plates 2 and 3. Another relay gear 21 is fixed to the other end of the shaft 20 so as to be engaged with an unshown toothed portion of the left drive arm 13.

A cassette guide 22 is provided for guiding a cassette when inserting the same into the cassette holder unit 1 and for connecting the side plates 2 and 3 to each other. A top plate 23 is provided for connecting the side plates 2 and 3 to each other at a top portion of the cassette loading apparatus and for giving rigidity to the entire cassette loading apparatus.

The conventional cassette loading apparatus shown in FIG. 1 is assembled as follows. When assembling, the cassette holder unit 1 and the side plates 2 and 3 are positioned so that the projecting pins 4 to 7 are received in or engaged with the L-shaped guide slots 8 to 11 of the side plates 2 and 3. Generally, the cassette holder unit 1 is fixed on an unshown jig, and then the side plates 2 and 3, which are placed accurately at both sides of the cassette holder unit 1, are slowly shifted toward the cassette holder unit 1 so that the projecting pins 4 to 7 are received in the slots 8 to 11. The drive motor 16, the worrm 17 and the worm wheel 18 are attached to the right side plate 2 in advance as a drive unit, and the description of the way of assemblng the drive unit is omitted.

Both ends of the cassette guide 22 are secured to the side plates 2 and 3 respectively, and then the drive arms 12 and 13 are rotatably attached to a shaft 31 provided to the side plates 2 and 3 so that the projecting pins 4 and 5 of the cassette holder unit 1 are received in guide slots 15a and 15b respectively formed in the drive arms 12 and 13. Then the left relay gear 21 is pressed to be fitted to one end of the shaft 20 which penetrates the side plate 2 and 3. The right relay gear 19 is attached to the other end of the shaft 20 and is fixed by an E-shaped ring 32. These relay gears 19 and 21 are positioned by adjusting the engagement of their teeth so that the drive arms 12 and 13 at the right and left move simultaneously in synchronism. The top plate 23 is attached by way of screws 33a to 33d so that the strength of the entire cassette loading apparatus and accuracy are ensured to complete assembling.

However, with the above-mentioned structure the side plates 2 and 3 must be slowly shifted so that the projecting pins 4 to 7 are received in the L-shaped guide slots 8 to 11 of the left and right side plates 2 and 3. To this end a relatively large and complex jig for assembly is needed and it takes a relatively long period of time for assembling the cassette loading apparatus.

Figure 3:
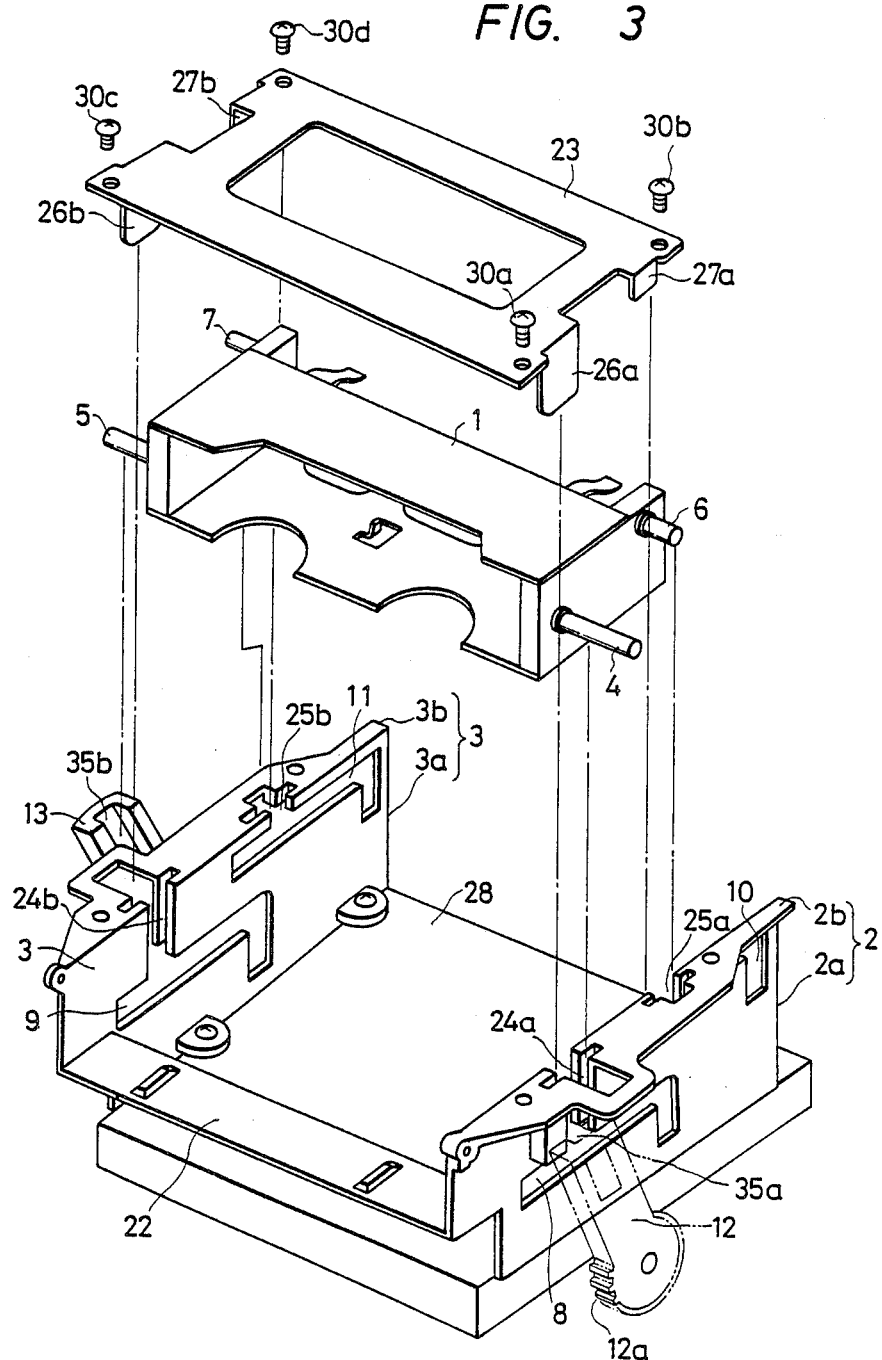
FIG. 3 is an exploded perspective view showing how to assemble an embodiment of a cassette loading apparatus according to the present invention.

Referring now to FIG. 3, a preferred embodiment of the present invention will be described with reference to an exploded view of the same. The reference 1 indicates a cassette holder unit for detachably holding an unshown tape cassette, such as a video cassette. The references 2 and 3 are side plates which are arranged at both sides of the cassette holder unit 1. L-shaped guide slots 8 and 10 are formed in the right side plate 2, while L-shaped guide slots 9 and 11 are formed in the left side plate 3. Projecting pins 4, 5 and 6, 7 are provided to both sides of the cassette holder unit 1 to be engaged with the L-shaped guide slots 8, 9 and 10 and 11 respectively. Drive arms 12 and 13 are provided for moving the cassette holder unit 1 from a first position to a second position and vice versa. More specifically, the cassette holder unit 1 is moved horizontally and vertically assuming that the cassette loading apparatus is put horizontally, as the projecting pins 4, 5, 6 and 7 move along the L-shaped guide slots 8, 9, 10 and 11. The references 4a and 5a respectively show the projecting pins 4 and 5 which are at the second or loading position. The above-mentioned structure is substantially the same as that of the conventional apparatus of FIGS. 1 and 2.

The side plates 2 and 3 respectively have upright portions 2a and 3a and flange portions 2b and 3b which are normal to the upright portions 2a and 3a. Cutouts 24a and 25a are formed in the right side plates 2 while cutouts 24b and 25b are formed in the left side plates 3. Paying attention to the right side plate 2, a first cutout 24a is made to extend from the flange portion 2b to the upright portion 2a to be continuous to the L-shaped guide slot 8, while a second cutout 25a is made to extend from the flange portion 2b to the upright portion 2a to be continuous to the L-shaped guide slot 10. Cutouts 24b and 25b are made in the same manner in the left side plate 3 as the right side plate 2.

The reference 23 indicates a top plate which is to be attached to the flange portions 2b and 3b of the side plates 2 and 3 by way of screws 30a, 30b, 30c, 30d. The top plate 23 has two projecting plates 26a and 27a at its right end and another two projecting plates 26b and 27b at its left end. These projecting plates 26a, 26b, 27a, 27b are formed to be normal to the body of the top plate 23, and the position and size of these projecting plates 26a, 26b, 27a, 27b are predetermined so that these projecting plates 26a, 26b, 27a, 27b are fitted into the cutouts 24a, 24b, 25a, 25b when the top plate 23 is assembled with the side plates 2 and 3.

The drive arms 12 and 13 have toothed portions 12a and 13a respectively and are rotatably held at the outer side of the side plates 2 and 3. The drive arms 12 and 13 respectively comprise U-shaped recesses 35a and 35b at their arm portions for engagement with the projecting pins 4 and 5 of the cassette holder unit 1. As a mechanism for driving the drive arms 12 and/or 13 the conventional drive unit shown in FIGS. 1 and 2 may be used. Alternatively, a linearly reciprocating member which is driven by a drive source may be used to rotate one of the drive arms 12 and 13. In this case, if the drive arms 12 and 13 are fixed to a shaft as shown in FIGS. 1 and 2 so that both drive arms 12 and 13 rotate together, various parts for driving the drive arms 12, 13, i.e. worm 17, worm wheel 18, relay gears 19, 21 and E-shaped ring 32, can be omitted.

Figure 4:
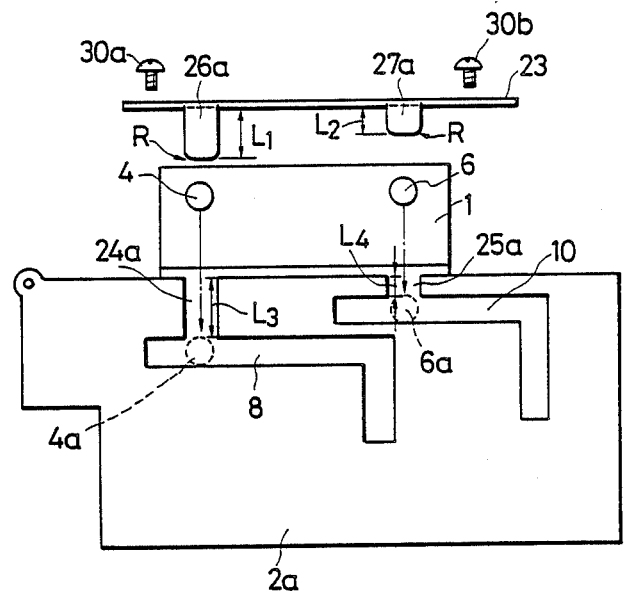
FIGS. 4 and 5 are side views of the embodiment shown in FIG. 3 for describing the way of assembling.
Figure 5:
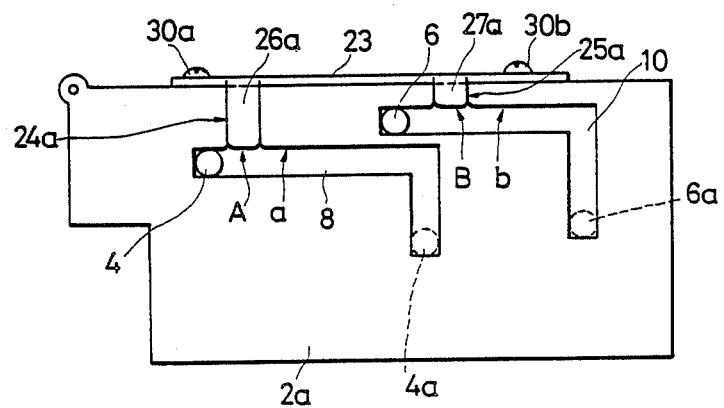

FIGS. 4 and 5 respectively show right side views of the cassette loading apparatus of FIG. 3. FIG. 4 shows an exploded view, whle FIG. 5 shows a state after assembly. Assuming that the effective lengths of the projecting plates 26a and 27a are given by L1 and L2, it is preferable that these lengths L1 and L2 have the following relationship with the effective lengths or depths L3 and L4 of the cutots 24a and 25a measured along the upright portion 2a:

$$L1 = L3 \tag{1}$$

$$L2 = L4 \tag{2}$$

However, the above relationship may be changed as follows depending on designing condition:

$$L1 < L3 \tag{3}$$

$$L2 < L4 \tag{4}$$

Even if the length relationship is arranged as expressed by formulas (3) and (4), no problem occurs on the movement of the projecting pins 4 to 7 of the cassette holder unit 1 since these pins 4 to 7 are slidingly guided by contacting the lower edge portion of the L-shaped guide slots 8 to 11 in receipt of the weight of the cassette holder unit 1.

In the illustrated embodiment, each of the projecting plates 26a and 27a has rounded corners R at the tip portion thereof for smooth insertion into the corresponding cutouts. Furthermore, such rounded corners R are useful for ensuring smooth movement of the projecting pins 4 to 7 even if L1 > L3 and/or L2 > L4. More specifically, even when the projecting plates 26a, 26b, 27a, 27b project downwardly from the upper edge of the L-shaped guide slots 8 to 11 due to slight error in size, the projecting pins 4 to 7 can move smoothly without being blocked by the projecting plates 26a, 26b, 27a, 27b because of the presence of such rounded corners R.

The way of assembling the cassette loading apparatus according to the present invention will be described with reference to FIGS. 3 to 5. First of all, the side plates 2 and 3 having the drive arms 12 and 13 are fixed to a chassis 28 of a mechanical portion of a magnetic recording/reproducing apparatus for instance, so that they oppose each other with a given distance therebetween. Then the cassette guide 22 is attached to the side plates 2 and 3 by way of screws or insertion. Subsequently, the drive arms 12 and 13 are arranged so that open ends of the U-shaped recesses 35a and 35b are directed to the top in the vicinity of the cutouts 24a and 24b. Under this condition, the cassette holder unit 1 is inserted from the top so that the projecting pins 4 to 7 are inserted into the cutouts 24a, 24b, 25a and 25b of the side plates 2 and 3 respectively. More specifically, the cassette holder unit 1 is moved downwardly so that the pins 4 and 6 come into contact with the lower edge portion of the L-shaped guide slots 8 and 10 respectively (see pins 4 and 6 illustrated by dotted lines in FIG. 4). As the cassette holder unit 1 is moved downwardly in the above-mentioned manner, the pins 4 and 5 enter the U-shaped recesses 35a and 35b of the drive arms 12 and 13 (which are not shown in FIGS. 4 and 5 for simplicity). As a result, the pins 4 and 5 engage the U-shaped recesses 35a and 35b to be slidable therein. Then the top plate 23 is attached to the side plates 2 and 3 such that the projecting plates 26a, 26b, 27a, 27b are inserted and fitted into the cutouts 24a, 24b, 25a, 25b. As the lengths of the projecting plates 26a, 26b, 27a, 27b are arranged as defined by the above-mentioned formulas (1) and (2), lower ends A and B of the projecting plates 26a and 27a are substantially flush with the upper edges "a" and "b" of the L-shaped guide slots 8 and 10. As a result, the cutouts 24a and 25a are filled with the projecting plates 26a and 27a completely so that the L-shaped guide slots 8 and 10 are substantially the same as the L-shaped guide slots in the conventional example of FIGS. 1 and 2. With this arrangement, the pins 4 and 6 are respectively movable from a first position shown by solid lines to a second position shown by dotted lines 4a and 6a (FIGS. 4 and 5). More specifically, in the first position where a tape cassette can be inserted into the cassette holder unit 1 and taken out of the same, the pins 4 and 6 are contactable with one end of the L-shaped guide slots 8 and 10, and in the second position where the cassette holder unit 1 brings the loaded cassette to be coupled with an unshown reel-drive mechanism mounted on the chassis 28 for recording and/or reproducing, the pins 4 and 6 are contactable with the other ends of the L-shaped guide slots 8 and 10.

Although the above description has been made in connection with only the right side plates 2, the relationship between the projecting pins 5 and 7 at the left side with the L-shaped guide slots 9 and 11 of the left side plate 3 is the same as that of the right side.

As will be understood from the above description, the pins 4 to 7 are used for limiting the horizontal and vertical movement of the cassette holder unit 1, and therefore, the number of these pins may be changed if desired.

From the foregoing it will be understood that the cassette holder unit 1 can be readily inserted from the top when assembling the same with the side plates, and therefore easy assembling has been effected so as to reduce manufacturing cost.

In addition, such simple assembling has made it possible to assemble the cassette loading apparatus within a recording/reproducing apparatus.

The above-described embodiment is just an example of the present invention, and therefore, it will be apparent for those skilled in the art that many modifications and variations may be made without departing from the scope of the present invention.

What is claimed is:
1. A cassette loading apparatus, comprising:
    (a) a pair of side plates fixed to a stationary member, said side plates being substantially parallel to each other, L-shaped guide slots and cutouts being formed in each of said side plates such that each L-shaped guide slot is continuous with an associated cut-out;
    (b) a cassette holder unit for holding a tape cassette therein and movable between first and second positions, said cassette eholder unit having a plurality of pins projecting in a direction substantially normal to said side plates such that said pins are respectively received by said L-shaped guide slots, said cutouts having an open end so that said pins can be inserted therethrough to be engaged with said L-shaped guide slots when assembling said loading apparatus; and
    (c) drive means for moving said cassette holder unit between said first and second positions by applying a driving force thereto.

2. A cassette loading apparatus as claimed in claim 1, further comprising a top plate arranged to be secured to said side plates, said top plate having projecting tabs respectively fitted into said cutouts.

3. A cassette loading apparatus as claimed in claim 2, wherein the effective length of each projecting tab is equal to or smaller than the effective depth of said cut-out in which said projecting tab is fitted.

4. A cassette loading apparatus as claimed in claim 3, wherein each of said projecting tabs has rounded corners at its tip portion.

5. A cassette loading apparatus as claimed in claim 2, wherein each of said projecting tabs has rounded corners at its tip portion.

6. A cassette loading apparatus as claimed in claim 1, wherein said drive means comprises a drive arm rotatably mounted to one of said side plates, said drive arm having a U-shaped recess for receiving said projecting pin therein.

7. A cassette loading apparatus as claimed in claim 1, wherein each of said side plates comprises an upright portion in which said L-shaped guide slots are formed, and a flange portion which is substantially normal to said upright portion, said cutouts being formed in said upright portion and in said flange portion to be continuous with said L-shaped guide slots.

* * * * *